(12) United States Patent
Das et al.

(10) Patent No.: US 6,676,892 B2
(45) Date of Patent: Jan. 13, 2004

(54) DIRECT SELECTIVE LASER SINTERING OF METALS

(75) Inventors: Suman Das, Ann Arbor, MI (US); Joseph J. Beaman, Austin, TX (US)

(73) Assignee: Board of Regents, University Texas System, Austin, TX (US)

( * ) Notice: Subject to any disclaimer, the term of this patent is extended or adjusted under 35 U.S.C. 154(b) by 0 days.

(21) Appl. No.: 09/873,055

(22) Filed: Jun. 1, 2001

(65) Prior Publication Data

US 2002/0015654 A1 Feb. 7, 2002

Related U.S. Application Data

(60) Provisional application No. 60/208,881, filed on Jun. 1, 2000.

(51) Int. Cl.[7] .............................. B32B 31/28; B22F 7/02
(52) U.S. Cl. ......................................................... 419/7
(58) Field of Search .............................................. 419/7

(56) References Cited

U.S. PATENT DOCUMENTS

| | | | |
|---|---|---|---|
| 4,323,756 A | 4/1982 | Brown et al. | |
| 4,863,538 A | 9/1989 | Deckard | |
| 4,938,816 A | * 7/1990 | Beaman et al. | ............. 156/62.2 |
| 5,053,090 A | * 10/1991 | Beaman et al. | ............. 156/62.2 |
| 5,084,113 A | 1/1992 | Mori et al. | |
| 5,155,324 A | * 10/1992 | Deckard et al. | ....... 219/121.64 |
| 5,156,697 A | 10/1992 | Bourell et al. | |
| 5,182,170 A | 1/1993 | Marcus et al. | |
| 5,207,371 A | 5/1993 | Prinz et al. | |
| 5,314,003 A | 5/1994 | Mackay | |
| 5,348,693 A | 9/1994 | Taylor et al. | |
| 5,354,414 A | * 10/1994 | Feygin | ......................... 156/630 |
| 5,427,733 A | 6/1995 | Benda et al. | |
| 5,639,070 A | * 6/1997 | Deckard | ...................... 264/497 |
| 5,640,667 A | 6/1997 | Freitag et al. | |
| 5,718,951 A | 2/1998 | Sterett et al. | |
| 5,732,323 A | 3/1998 | Nyrhila | |
| 5,745,834 A | 4/1998 | Bampton et al. | |
| 5,787,965 A | 8/1998 | Sterett et al. | |
| 5,837,960 A | 11/1998 | Lewis et al. | |
| 6,013,402 A | 1/2000 | Kanbayashi et al. | |
| 6,042,774 A | 3/2000 | Wilkening et al. | |
| 6,046,426 A | 4/2000 | Jeantette et al. | |
| 6,122,564 A | 9/2000 | Koch et al. | |
| 6,203,861 B1 | 3/2001 | Kar et al. | |
| 6,215,093 B1 | * 4/2001 | Meiners et al. | ......... 219/121.61 |
| 6,355,086 B2 | * 3/2002 | Brown et al. | .................. 75/235 |

OTHER PUBLICATIONS

Agarwala, Mukesh K. et al.; An Evaluation of the Mechanical Behavior of Bronze–NI Composites Produced by Selective Laser Sintering; Solid Freeform Fabrication Symposium Proceedings, The University of Texas at Austin; 193–203; 1993.

Carter, William T. and Jones, Marshall G.; Direct Laser Sintering of Metals; Solid Freeform Fabrication Symposium Proceedings, The University of Texas at Austin; 51–59; 1993.

(List continued on next page.)

*Primary Examiner*—Daniel J. Jenkins
(74) *Attorney, Agent, or Firm*—Fulbright & Jaworski L.L.P.

(57) ABSTRACT

A method of fabricating a fully dense, three dimensional object by direct laser sintering is disclosed. In a chamber with a partial pressure atmosphere, a beam of directed energy melts metallic powder in order to form a solid layer cross section. Another layer of powder is deposited and melted, along with a portion of the previous layer. The energy beam typically is in the form of a laser, scanning along a path resembling a parametric curve or another, arbitrary piecewise parametric curve. In another embodiment, the previous layer is not remelted, thus creating an oxide film that acts as a clean stop to prevent unwanted downward growth.

8 Claims, 3 Drawing Sheets

OTHER PUBLICATIONS

Das, Suman et al.; Processing of Titanium Net Shapes by SLS/HIP; Solid Freeform Fabrication Symposium Proceedings, The University of Texas at Austin; 469–477; 1998.

Das, Suman et al.; Producing Metal parts with Selective Laser Sintering/Hot Isostatic Pressing; JOM; Dec. 17–20, 1998.

Davé, V.R. et al.; Electronic Beam Solid Freeform Fabrication of Metal Parts; Solid Freeform Fabrication Symposium Proceedings, The University of Texas at Austin; 64–71; 1995.

Fessler, J. R., et al.; Laser Deposition of Metals for Shape Deposition Manufacturing; Solid Freeform Fabrication Symposium Proceedings, The University of Texas at Austin; 117–124; 1996.

Griffith, M. L. et al.; Free From Fabrication of Metallic Components Using Laser Engineered Net Shaping (Lens™); Solid Freeform Fabrication Symposium Proceedings, The University of Texas at Austin, 125–131; 1996.

House, M. A. et al.; Rapid Laser Forming of Titanium Near Shape Articles: LaserCast™; Solid Freeform Fabrication Symposium Proceedings; The University of Texas at Austin; 239–248; 1996.

Klocke, Fritz; et al.; Direct Manufacturing of Metal Prototypes and Prototype Tools; Solid Freeform Fabrication Symposium Proceedings, The University of Texas at Austin; 141–148; 1996.

Lewis, Gary K. et al.; Properties of Near–Net Shape Metallic Components Made by the Directed Light Fabrication Process; Solid Freeform Fabrication Symposium Proceedings, The University of Texas at Austin; 513–520; 1997.

Manriquez–Frayre, J. A. and Bourell, D. L.; Selective Laser Sintering of Binary Metallic Powder; Solid Freeform Fabrication Symposium Proceedings, The University of Texas at Austin; 99–106; 1990.

Manriquez–Frayre, J. A. and Bourell, D. L.; Selective Laser Sintering of Cu–Pb/Sn Solder Powders; Solid Freeform Fabrication Symposium Proceedings, The University of Texas at Austin; 236–244; 1991.

Mazumder, J. et al.; The Direct Metal Deposition of H13 Tool Steel for 3–D Components; JOM; 55–60; May 1997.

Prabhu, Gopalakrishna B. and Bourell, David L.; Supersolidus Liquid Phase Selective Laser Sintering of Prealloyed Bronze Powder; Solid Freeform Fabrication Symposium Proceedings, The University of Texas at Austin; 317–324; 1993.

Ribeiro, A. F. and John Norrish; Rapid Prototyping Process Using Metal Directly; Solid Freeform Fabrication Symposium Proceedings, The University of Texas at Austin; 249–256; 1996.

Sindel, M. et al.; Direct Laser Sintering of Metals and Metal Melt Infiltration for Near Net Shape Fabrication of Components; Solid Freeform Fabrication Symposium Proceedings, The University of Texas at Austin; 94–101; 1994.

Weiss; Wendy and Bourell D. L.; Selective Laser Sintering to Produce NI–SN Intermetallics; Solid Freeform Fabrication Symposium Proceedings, The University of Texas at Austin; 251–258; 1991.

Zong, G. et al.; Direct Selective Laser Sintering of High Temperature Materials; Solid Freeform Fabrication Symposium Proceedings, The University of Texas at Austin; 72–85; 1992.

* cited by examiner

DIRECT SELECTIVE LASER SINTERING OF METALS

CROSS-REFERENCE TO RELATED APPLICATIONS

This application claims priority to U.S. Provisional Application No. 60/208,881 filed Jun. 1, 2000.

FIELD OF THE INVENTION

The present invention relates to a method for using a directed beam of energy to selectively sinter metal powder to produce a part. Specifically, the invention relates to the use of selective laser sintering (SLS) in order to produce a full density metal part.

BACKGROUND OF THE INVENTION

Solid Freeform Fabrication (SFF) is a group of emerging technologies that have revolutionized product development and manufacturing. The common feature shared by these technologies is the ability to produce freeform, complex geometry components directly from a computer generated model. SFF processes rely on the concept of layerwise material addition in selected regions. A computer generated model serves as the basis for making a replica. The model is mathematically sliced and each slice is recreated in the material of choice to build a complete object. A typical SFF machine is a "miniature manufacturing plant" representing the convergence of mechanical, chemical, electrical, materials and computer engineering sciences.

The first application of SFF technologies was in the area of Rapid Prototyping (RP). Rapid Prototyping enables design and manufacturing engineers to quickly fabricate prototypes in a fraction of the times and at typically less than half the costs in comparison with conventional prototyping methods. The tremendous economy of RP is facilitated by its high degree of automation, both in the design and fabrication cycles. On the design side, the advantages are at least fourfold. First, the use of Computer Aided Design (CAD) solid modeling software allows the design of a component to be stored digitally, obviating the need for detailed technical drawings and the extensive manual labor associated therewith. Second, the advent of so-called "parametric" CAD modeling software allows facile incorporation of design changes into an existing CAD design quickly. Third, the same CAD solid model can be fed to a variety of dynamic, mechanical and thermal analyses software, resulting in a high degree of design integration. Finally, each CAD model can be electronically "tagged" for incorporation into databases that store information on parts assemblies, design variants and manufacturing methods. Lately, a move towards standardizing such information integration is taking place in the specification of the Standard for Exchange of Product Data (STEP). On the manufacturing side, computer driven RP machines accept the CAD solid model as input to automatically create a physical realization of the desired component. The major advantage realized here is the substantial elimination of process planning, operator expertise, additional tooling and set-up. The overall advantage of this powerful combination is the ability to rapidly iterate through several design and prototyping cycles before "freezing" the design for final production at significantly lowered costs and shorter "time to market".

Most RP technologies were initially developed for polymeric materials. These technologies allowed designers to rapidly create solid representations of their designs in a surrogate material for design visualization and verification. Further demand for functional prototypes led to the development of materials and processes that enabled production of prototype patterns and parts that could be subjected to limited testing for form and fit. Major developments have taken place next in the area of SFF known as Rapid Tooling. The focus of this area has been to develop SFF technologies to enable rapid production of prototype tooling for a variety of manufacturing techniques including injection molding, electro-discharge machining and die casting. The growth in this area has been spurred by the economical advantages of making limited run prototype tooling via SFF as compared to conventional techniques.

Over the past ten years, there has been an explosion in the development and growth of SFF technologies. These technologies can be broadly categorized into three classes, namely transfer, indirect and direct SFF methods. Transfer methods are those methods that use a pattern or sacrificial intermediary to generate the desired component whereas "indirect" methods are those SFF methods that directly produce intermediate density parts that undergo post-processing such as conventional sintering and infiltration to attain full density. Direct methods are methods that directly produce fully dense or near fully dense complex shaped parts in the desired composition (e.g. metal, ceramic or cermet) by applying a geometry and property transformation to the material with minimal post-processing requirements. In the context of making metal components by SFF, a number of "transfer" and "indirect" methods are available.

Selective laser sintering (SLS) is a SFF technique that creates three-dimensional freeform objects directly from their CAD models. An object is created by selectively fusing thin layers of a powder with a scanning laser beam. Each scanned layer represents a cross section of the object's mathematically sliced CAD model.

Direct Selective Laser Sintering (Direct SLS), the relevant field of this invention, is a direct SFF technique. Direct SLS is a laser based rapid manufacturing technology that enables production of functional, fully dense, metal and cermet components via the direct, layerwise consolidation of constituent powders. In Direct SLS, a high energy laser beam directly consolidates a metal or cermet powder to a high density (>80%), preferably with minimal or no post-processing requirements. The main advantages associated with this technique are elimination of expensive and time-consuming pre-processing and post-processing steps. In comparison with "indirect SLS", direct SLS is a binderless process. Direct SLS also does not involve furnace de-binding and infiltration post-processing steps as in "indirect SLS". Compared to conventional bulk metal forming processes (e.g. casting or forging), direct SLS does not require the use of patterns, tools or dies. The metal powder being processed by direct SLS directly undergoes a shape and property transformation into final product that may require minimal post-processing such as finish machining.

Several processing requirements differentiate direct SLS of metals from SLS of polymers or polymer coated powders. Perhaps the most important distinguishing characteristic is the regime of high temperatures involved in direct SLS of metals. At the temperatures necessary for processing metals of interest (generally >1000° C.), the reactivity of the melt poses serious process control issues. Control of the processing atmosphere takes on paramount importance since it not only enables successful layerwise buildup but also addresses safety concerns. In one particular application of SLS known as SLS/HIP, the goal of in-situ containerization of a part fabricated during SLS processing requires that it take place under vacuum to ensure full densification of the canned shape during HIP post-processing.

Until recently, no work was reported on direct SLS of high performance materials, such as Nickel and Cobalt base superalloys, superalloy cermets, Titanium base alloys and monolithic high temperature metals such as Molybdenum. These materials are used for high performance components that typically experience high operating temperatures, high stresses and severe oxidizing or corrosive environments. Direct SLS, with its ability to produce components in such materials is especially useful for functional prototype, low volume or "one of a kind" production runs. To manufacture a typical prototype lot of 100 superalloy cermet abrasive turbine blade tips, direct SLS can achieve acceptable microstructure and properties with 80% cost savings over the traditional methods. Aerospace industries face typical lead times of several dozen weeks for functional, metallurgical quality prototypes. Direct SLS can lower cost and drastically reduce lead times by eliminating pre-processing and post-processing steps, and by eliminating the need for specialized tooling.

A new, hybrid net shape manufacturing technique known as Selective Laser Sintering/Hot Isostatic Pressing (SLS/HIP) exploits the freeform shaping capabilities of SLS combined with the full densification capability of HIP to rapidly produce complex shaped metal components. SLS/HIP is a significantly faster, low cost, highly automated, flexible replacement for conventional powder metallurgy and HIP processes that are currently employed in the naval and aerospace defense sectors for the manufacture of low volume or "one of a kind" high performance components.

BRIEF SUMMARY OF THE INVENTION

The present invention includes a directed energy beam, such as a laser, and is adaptable to produce almost any single layer or multi-layer three dimensional metal part.

Broadly speaking, the method comprises sequentially depositing layers of metal powder into a chamber with a partial pressure atmosphere. Once a layer of powder is deposited, a scanning laser beam selectively fuses the layer of the powder into the desired shape. The process continues until a nonporous or fully dense part is completely fabricated, layer by layer.

In the preferred embodiment, the laser does not follow the traditional raster scanning path. Rather, the laser employs a continuous vector ("CV") mode of scanning, which allows each individual motion segment to take place in an arbitrary direction, but treating successive segments as part of a continuous path. Typically, the scan follows the path of a parametric curve such as an Archimedes spiral or another arbitrary, piecewise parametric curve that follows the contours of the outer boundary of the scan, such that a constant melt pool is always maintained under the laser beam. In the preferred method, the scan path is further modified so that the scan begins at a point inside of the area to be fully densified, where a finite starting radius for the path is defined. The scan begins by tracing a circle with the starting radius for the path and repeats scanning around the starting radius up to 20 times. Simultaneously ramping the laser power to a terminal power while doing so creates a melt pool at the center while avoiding balling that takes place at the location of initial incidence of a laser beam on a metal powder bed. Further, in the preferred method, the laser beam is allowed to oscillate in a path perpendicular to the scan path of the laser, so as to stop any forward velocity of the melt that may break up the continuity of the solid-liquid interface.

In the preferred form, inert gas is allowed to enter the chamber by a controlled leak, so as to reduce vaporization of the metals or alloying elements under the beam, as well as to reduce condensation of any vaporized metal on the laser window or other relatively cold areas of the chamber. The leak should result in a vacuum level of $10^{-2}$ to $10^{-4}$ Torr, preferably a vacuum level of $10^{-3}$ Torr.

Additionally, in another preferred embodiment of the present method, the speed and power of the laser beam is such that there is a constant melt pool under it. Further, another embodiment sets the scan spacing of the beam to achieve the same result.

In yet another embodiment, after a supporting layer is built by sintering, the next layer is skipped, leaving the supporting layer with an oxide surface. Such a surface acts as a well-defined stop-off layer, exploiting a condition normally avoided at great expense.

As can be appreciated from the above general description, the present invention solves many of the problems associated with known part production methods. By using the techniques described above, fully dense metal components can be formed by Direct SLS. These techniques are also useful for fabrication of integrally canned shapes for SLS/HIP processing. An integrally canned shape can be thought of as composed of four distinct regions: the bottom "end-cap," the top "end-cap," the skin, and the interior powder core. The end-caps and the skin make up the "can," or the container portion that must be nonporous and leak free. The interfaces between the end-caps and skin, as well as the interfaces between adjacent skin layers must be leak free, necessitating their full density fabrication. Such skins need not be removed by machining or chemical etching, thus avoiding the delays, expense, and environmental or safety concerns associated with such techniques.

DETAILED DESCRIPTION OF THE INVENTION

Figure 1:
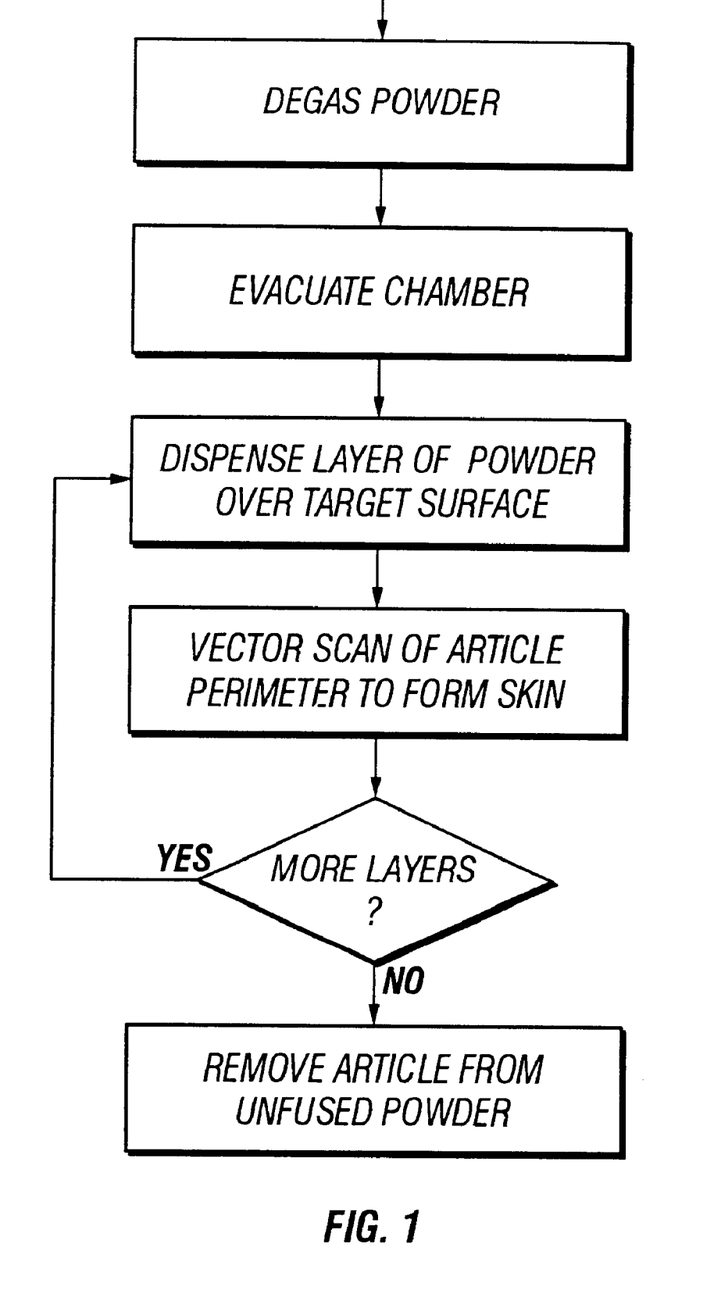
FIG. 1 is a flow diagram of the method of the present invention.

FIG. 1 broadly illustrates the method of the present invention. A number of variations, related to pre-processing and processing steps, may be employed to optimize the results.

An apparatus to provide the directed energy could be any commercially acceptable laser capable of melting a broad variety of metallic powders with or without preheating the powder bed. Such an apparatus must also include a scanning control means capable of tracing the a programmed scan path. The preferred laser is capable of melting a broad variety of metallic powders without preheating the powder bed. A particular example of preferred laser for the present invention is a 250 Watt continuous wave (CW) Nd:YAG laser with a 6 mm beam diameter ($1/c^2$), 18 mrad fall angle divergence and wavelength of 1.06 $\mu$m. The preferred beam diameter would be on the order of 100–500 $\mu$m. Preferably, any powder used in the method is composed of particles that are nearly identical in both size and sphericity and free of any internal porosity. Materials meeting such requirements are well known and available. Powders made up of smaller particles (10–100 μm) are preferred, but particle size may vary depending on the specifications of the part to be built. The appropriate particle size will be apparent to one of reasonable skill in the art.

In preprocessing, the preferred method avoids the common technique of preheating the powder bed before SLS processing. However, preheating can result in an acceptable product. The preheat temperature varies according to the material to be sintered. For example, the preheat may be used to bring the temperature of the powder to a point just below the melting point of the powder. A preferred apparatus for employing the method would be equipped with a heating device, such as a molybdenum rod element that can achieve temperatures up to 1000° C.

In further preprocessing, the powder must be degassed in order to produce acceptable results. The powder may be degassed by a static hot degas method that heats powder in a container under vacuum by radiant heating. However, so as to avoid any burning of powder, a dynamic degassing method is preferred, exposing each portion of powder to the same heat. A preferred apparatus for such dynamic degassing is an inert stirring device introduced into the powder container, so as to circulate the powder uniformly during the degas cycle.

In employing this method, the preferred processing atmosphere is a high vacuum level on the order of $10^{-3}$ Torr. Such an atmosphere produces results markedly superior to inert gas atmospheres which contain unacceptable levels of contaminants in the form of water and oxygen. Such contaminants create oxide films on sintered layers, preventing good bonding between subsequently sintered layers and preventing molten material from flowing freely. Further, with the goal of in situ containerization in SLS/HIP processing, SLS must necessarily be performed under a high vacuum. A preferred apparatus for practicing the present invention would be designed for vacuum operation. Such a partial pressure atmosphere is achieved by evacuating the chamber to a high vacuum level ($5 \times 10^{-7}$ to $1 \times 10^{-5}$ Torr), followed by a back fill to partial pressure with an ultrahigh purity inert gas such as 99.999% purity Argon or Helium (<2 ppm oxygen, <3 ppm moisture, <1 ppm hydrocarbons and <6 ppm nitrogen).

A vacuum level of $10^{-3}$ Torr also reduces vaporization of alloying elements from the melt pool and condensation of metal vapors on the laser window. To further prevent such condensation, it is preferable to maintain a fine leak of ultra-high purity (UHP) inert gas such as Argon or Helium just under the laser window after evacuating the chamber to high vacuum. A preferred apparatus for maintaining such a leak would comprise a double sided flange introduced between the laser window and a flange on the chamber side window mount, a weld fitting stainless steel tubing welded on the side of the double sided flange, a variable leak valve connected via stainless steel tubing to the fitting on the double sided flange, and connected on the inlet side of the leak valve, a stainless steel diaphragm gas regulator mounted on a UHP gas cylinder via stainless steel tubing with fittings at both ends. A knurled, fine control knob and lever mechanism with a mechanical advantage of 13000:1 on the leak valve would allow precise control of gas inflow.

A preferred system for controlling the processing atmosphere vacuum level comprises a vapor diffusion pump backed by a mechanical vacuum pump. The system also comprises a gate valve mated with a high conductance 90° elbow, in turn mated with a wide diameter flanged port fitted to the chamber. Preferably, the gate valve comprises a "roughing port" as well. Preferably, any interfaces in the system would be finished so as to minimize any leakage. Preferably, all walls of the chamber except that for introducing powder into the chamber would be fusion welded, so as to minimize the need for O-ring seals and the unreliability associated therewith. In order to prevent ejection of powder from the feed and part side cylinders during chamber evacuation, pressure between the chamber void space above the powder bed and the void space below the columns of powder in the feed and part cylinders is equilibrated. This is achieved by connecting the aforementioned void spaces using stainless steel bellows hose. The rate of evacuation is controlled by the use of bellows valves installed at each evacuation port.

An apparatus for delivering powder into the chamber comprises part and feed side powder cylinders, a powder delivery roller and associated actuators. To maintain vacuum integrity, stainless steel edge-welded bellows preferably would be used for the part, feed and roller actuator shafts. In order to transmit rotational motion to the roller, a hollow actuator shaft with a concentric rotary shaft coupled to a bevel gear system could be used. One end of the rotary shaft could be connected via the bevel gear system to the roller, and its outer end could be coupled to a MDC Direct Drive high vacuum rated rotational feed-through. A flexible shaft could transmit rotational motion from a DC motor mounted on the machine frame to the ambient atmosphere end of the feed-through. The flexible shaft must be sufficiently long so as to provide rotation to the roller shaft via the rotary feed-through as the entire roller assembly would reciprocate along the powder bed. It has been found that an apparatus for powder delivery should comprise a motor that is sufficiently small and lightweight, so as to prevent the flexible shaft from wrapping around itself, a condition that may lead to inconsistent powder delivery. In the apparatus for powder delivery, the actuator for providing reciprocating motion to the roller assembly torque would include a means for holding itself in place when back driving a load greater than 45N (10 lbs.) Such actuators are known in the art. An apparatus for delivering powder also would have an optimized center to center distance between the part and feed cylinders, such that the powder plate would receive maximized uniform heat flux from the heaters in the event of their use, without sacrificing efficiency of powder delivery. Further, any expansion slots (to prevent buckling of the powder plate when it is heated) that may be present in the powder plate of an apparatus for powder delivery preferably would comprise a means for blocking any transfer of powder through those slots, but that blocking means would be flexible enough to allow the powder plate to expand without buckling when it is heated.

Figure 2:
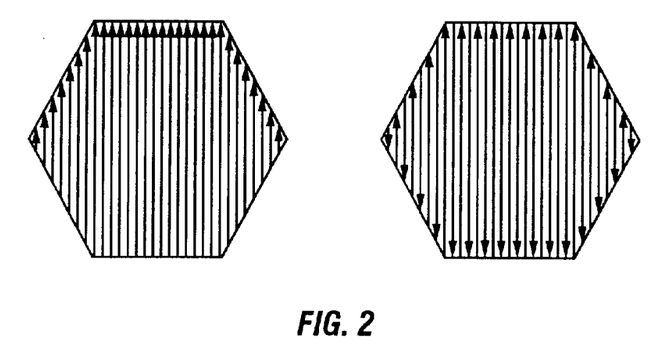
FIG. 2 is a representation of a raster scan pattern.
Figure 3:
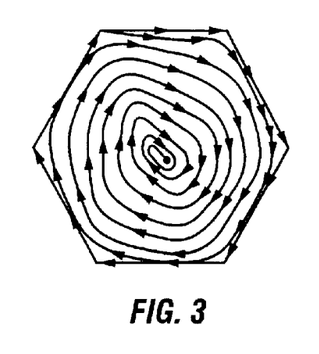
FIG. 3 is a representation of a continuous vector scan pattern.
Figure 4:
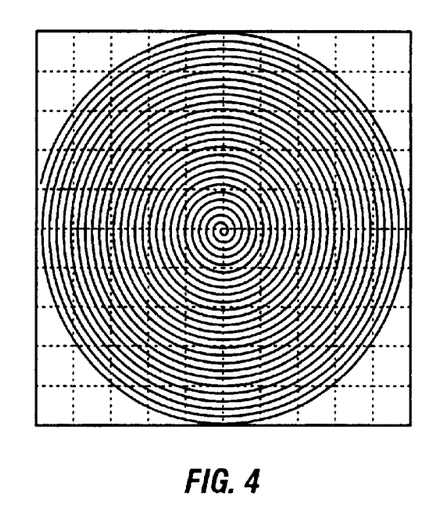
FIG. 4 is a representation of an Archimedes spiral.

Once powder is deposited, the laser scans along a predetermined path in order to selectively fuse the powder into the shape to be built. In the preferred embodiment, the laser does not follow a traditional raster scanning path (FIG. 2). Rather, the laser employs a continuous vector ("CV") mode of scanning (an example of which is FIG. 3), which allows each individual motion segment to take place in an arbitrary direction, but treating successive segments as part of a continuous path, such that a constant melt pool is always maintained under the laser beam. Typically, the scan follows the path of a parametric curve such as an Archimedes spiral (FIG. 4) or another arbitrary, piecewise parametric curve that fills the area of the cross section to be fabricated.

Figure 5:
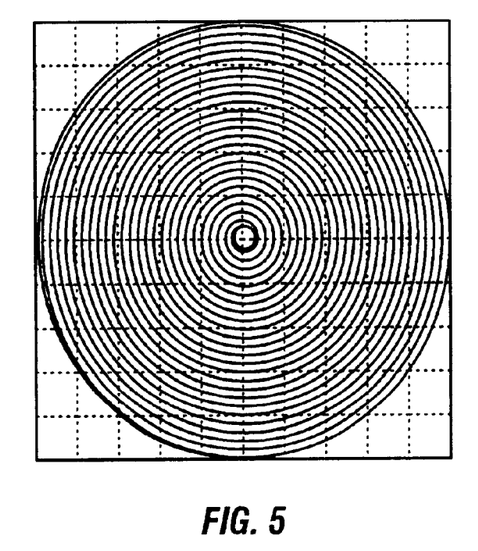
FIG. 5 is a representation of a modified neoid scan pattern.

Preferably, that scan path follows a parametric curve or another arbitrary, piecewise parametric curve that corresponds to the contours of the interior and exterior boundaries of the cross section to be fabricated. Maintaining a constant melt pool is important to forming a homogenous, nonporous product and involves not only maintaining a constant melt pool in the layer presently scanned, but also maintaining a constant remelt of a portion of the layer just previously scanned. A typical CV scan path is a neoid scan pattern (FIG. 5), beginning at a point inside of the area to be fully densified, where a finite starting radius for the path is defined. Preferably, the starting radius should approximate the beam diameter of the laser, so that there is no unexposed powder inside the radius. Another typical scan path could be a cycloid path. The scan begins by tracing a circle with the starting radius for the path and repeats scanning around the starting radius up to 20 times. Simultaneously ramping the laser power to a terminal power while doing so allows creation of a melt pool at the center while avoiding balling that takes place at the location of initial incidence of a laser beam on a metal powder bed. Further, in the preferred method, the laser beam oscillates in a path perpendicular to the scan path of the laser, so as to stop any forward velocity of the melt that may break up the continuity of the solid-liquid interface. Scan speed should be in the range of about 0.1–10.0 inches/second. Scan spacing between successive rotations of the CV scan path should be set in a range of about 0.0001–0.020 inches, preferably about 0.0001–0.005 inches.

Figure 6:
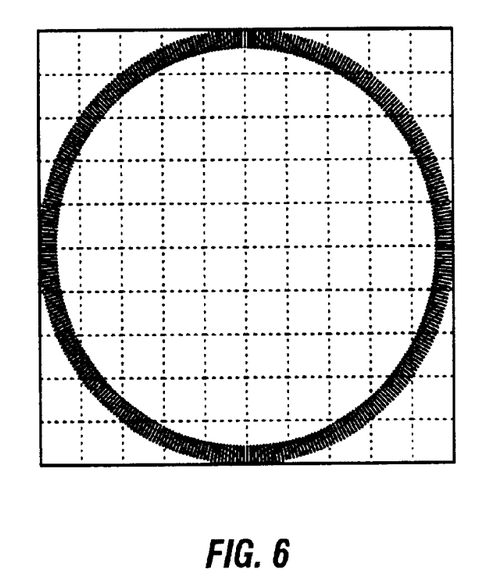
FIG. 6 is a representation of a radial scan pattern.

The scan pattern for processing an annular region corresponds to the radial scan pattern illustrated in FIG. 6. While the scan path truly is angular in nature, the angles of the scan path are acute to the point where the lines are virtually and functionally parallel, radiating outward (thus the term "radial scan"). After a rotation is complete, an additional overlap scan of about 25° (preferably about 25.7°) should be included to fully melt and resolidify the starting segment of the of the scan over which laser power ramping takes place. Thickness of layers should be about 0.005 inches. Scan spacing between the radial lines should be in the range of about 0.0001–0.010 inches, preferably about 0.00015 inches.

In SLS/HIP processing, for the top end-cap, the neoid scan pattern should be employed in the same way it was for the bottom end-cap, followed by a scan pattern of concentric rings (each ring corresponding the radial scan path illustrated in FIG. 6) of successively smaller diameters, starting at the outer diameter of the end-cap. An overlap of about 50% should be employed between successive rings. Following with the radial scan pattern ensures that complete bonding and continuous interface between the top end-cap and the underlying skin layer.

An important aspect of the present invention involves the bonding of successive layers over previous ones. In fusing successive layers, the present invention comprises remelting a portion of the previous layer. This highly important process of remelting the previous layer is analogous to dilution or "meltback" step in fusion welding. Doing so eliminates any contaminants or oxide film that may have formed on the previous layer, thus preventing sufficient bonding between the layers so as to form a nearly nonporous product. More importantly is that, during solidification, grain growth with occur at the solid-liquid interface between the base metal and the liquid in contact with it, as in the epitaxial solidification known to occur in fusion welding. Thus, remelting the base layer allows epitaxial grains to grow heterogeneously.

Some alloys (such as Alloy 625) tend to crack in Direct SLS, in both axial and planar directions along the end-cap/core interface and in the part interior. While a significantly longer sinter cycle reduces such cracking, it also increases delay and expense. A preferable solution to cracking is to decrease scan spacing, increase scan speed and decrease the starting diameter to ensure that a melt pool forms in the center, rather than leaving an unsintered region in the center.

In the preferred embodiment, metal powder preferably in the vacuum degassed state at room temperature is placed in the feed side cylinder. The chamber is closed and evacuated first by a mechanical pump via a roughing port to about $10^{-3}$ Torr. At this vacuum level, the roughing port is closed off and the gate valve connecting the chamber to the vapor diffusion pump is opened. The chamber is now further evacuated to high vacuum (preferably $10^{-6}$Torr). At this point, a small leak of ultra-high purity inert gas such as Argon or Helium is introduced into the chamber via a leak valve connected to the chamber via stainless steel tubing. The leak is adjusted so that a dynamic partial pressure of about $10^{-3}$ Torr is established inside the chamber while the inert gas is constantly flowing into the chamber and swept out of the chamber through the diffusion pump. A piston in the feed cylinder moves up by about 0.005 inches, pushing a layer of powder above the surface of the powder plate. A roller actuator next moves a horizontal, cylindrical, counter-rotating roller across the powder plate. This movement of the roller sweeps the new layer of powder across the powder plate and deposits it at the surface of the part cylinder. Next, a laser beam actuated by a pair of galvanometer scanners scans a pattern under computer control over the newly deposited layer of powder. The scan pattern ensures that the powder is fused to form a fully dense layer of the desired shape and is completely bonded to the previously solidified layer underneath. After scanning is complete, the part side piston is lowered by about 0.005 inches, and another layer of fresh powder is deposited according to the procedure described earlier. The next layer of desired shape is next scanned by the laser and this process repeats, building up the object layer-by-layer until the complete object has been constructed.

A variation of the present invention solves a problem particular to metal processing. In laser sintering, substantial unwanted downward growth can occur in fresh powder layers with no underlying solid layer. By building a support layer, and then "skipping" a layer, the oxide surface film that forms on the supporting layer will act as a well-defined stop-off layer, thus alleviating the unwanted growth. The method begins as usual, scanning one or more layers and building upward with successive layers. The variation is practiced if the shape of the next cross section to be fabricated (the "second cross section) is such that it would not rest completely within the interior and exterior boundaries of the current cross section (the "first cross section"). The powder that will lie under the second cross section, but that lies outside of the first cross section, is scanned to form a "dummy layer." In scanning the second cross section, the portions of the second cross section that lie over the first cross section are scanned normally, remelting a portion of the first cross section in order to eliminate any oxide films in order to create a nonporous, homogenous product. However, the portions of the second cross layer that fall outside the boundaries of the first cross layer are scanned so that no portion of the first cross section is remelted (scanning parameters such as scan speed, scan spacing, and laser power should be adjusted according to the material scanned). The underlying oxide film will provide a barrier to any unwanted, downward growth.

In postprocessing, it is preferable to allow the part and leftover powder to cool under vacuum for about 12 hours, at which time the processing chamber is purged to atmospheric pressure with argon or helium. Such a "cooldown" avoids oxidation of the metal powder and allows any unsintered powder to be reused after collection.

What is claimed as new and desired to be protected by Letters Patent of the United States is:

1. A method for direct laser sintering of metals, comprising:
   depositing a layer of metallic powder onto a target surface in a chamber with a partial pressure atmosphere; and
   directing energy at selected locations of the layer corresponding to a cross section of a part, wherein the directed energy melts the layer at the selected locations and the selected locations comprise a continuous vector scan path
   wherein the continuous vector scan path comprises an area-filling scan whereby each distinct bounded region of the scan is scanned so that the scan path never intersects itself and the energy is continuously applied until the entire distinct bounded region is scanned.

2. The method of claim 1, wherein the continuous vector scan path further comprises a starting radius and further comprising the step of directing the energy around the starting radius a plurality times before directing the energy over the remaining scan path.

3. The method of claim 2, further comprising the step of directing energy at second selected locations, wherein the second selected locations resemble a plurality of concentric circles.

4. The method of claim 1, further comprising the step of directing energy at second selected locations, wherein the second selected locations resemble a plurality of concentric circles.

5. A method for direct laser sintering of metals, comprising:
   depositing a supporting layer of metallic powder onto a target surface in a chamber;
   directing energy at first selected locations of the supporting layer corresponding to a first cross section of a part, wherein the directed energy melts the supporting layer at the first selected locations;
   directing energy at second selected locations of the supporting layer, wherein the second selected locations do not correspond to the first cross section and the directed energy melts the supporting layer at the second selected locations;
   depositing a second layer of metallic powder on the supporting layer; and
   directing energy at third selected locations of the second layer, wherein the third selected locations correspond to the second selected locations and no portion of the supporting layer at the second selected locations is remelted.

6. The method of claim 1, wherein the partial pressure atmosphere is a vacuum on the order of $10^{-2}$ to $10^{-7}$ Torr.

7. The method of claim 1, wherein the partial pressure atmosphere is a vacuum on the order of $10^{-2}$ to $10^{-4}$ Torr.

8. The method of claim 1, wherein the partial pressure atmosphere is a vacuum on the order of $10^{-3}$ Torr.

* * * * *

UNITED STATES PATENT AND TRADEMARK OFFICE
CERTIFICATE OF CORRECTION

| | | |
|---|---|---|
| PATENT NO. | : 6,676,892 B2 | Page 1 of 1 |
| APPLICATION NO. | : 09/873055 | |
| DATED | : January 13, 2004 | |
| INVENTOR(S) | : Suman Das et al. | |

It is certified that error appears in the above-identified patent and that said Letters Patent is hereby corrected as shown below:

In column 1, line 9, insert
--This invention was made with government support under contract N00014-95-C-0139 awarded by Office of Naval Research. The government has certain rights in the invention.--.

Signed and Sealed this
Twenty-first Day of June, 2011

David J. Kappos
*Director of the United States Patent and Trademark Office*